United States Patent
Zhou et al.

(10) Patent No.: US 6,201,901 B1
(45) Date of Patent: Mar. 13, 2001

(54) BORDER-LESS CLOCK FREE TWO-DIMENSIONAL BARCODE AND METHOD FOR PRINTING AND READING THE SAME

(75) Inventors: Jiangying Zhou, Columbia, SC (US); Daniel P. Lopresti, Hopewell, NJ (US); Andrew Tomkins, San Jose, CA (US)

(73) Assignee: Matsushita Electronic Industrial Co., Ltd. (JP)

( * ) Notice: Subject to any disclaimer, the term of this patent is extended or adjusted under 35 U.S.C. 154(b) by 0 days.

(21) Appl. No.: 09/088,189

(22) Filed: Jun. 1, 1998

(51) Int. Cl.⁷ .............................. G06K 9/54; G06K 9/60; G06K 7/10
(52) U.S. Cl. .................. 382/306; 382/289; 382/306; 235/462.1; 235/462.09
(58) Field of Search ............................ 382/190, 195, 382/294, 296, 306, 318, 100, 232, 193, 289, 182, 183, 312, 309, 203, 164, 165; 235/456, 437, 462.09, 462.1, 470, 494, 454, 462.23, 462.36; 358/433, 445, 447, 448; 250/236, 568; 283/70

(56) References Cited

U.S. PATENT DOCUMENTS

| | | |
|---|---|---|
| D. 377,501 | 1/1997 | Pierce . |
| 5,065,437 | 11/1991 | Bloomberg .......................... 382/176 |
| 5,073,954 | 12/1991 | Van Tyne et al. ............... 235/462.08 |
| 5,091,966 | 2/1992 | Bloomberg et al. ................. 382/203 |
| 5,337,362 | 8/1994 | Gormish et al. ...................... 380/54 |
| 5,487,115 | 1/1996 | Surka .................................. 382/296 |
| 5,517,587 * | 5/1996 | Backer et al. ...................... 382/296 |
| 5,737,442 * | 4/1998 | Alam .................................. 382/181 |
| 5,790,715 | 8/1998 | Iizuka ................................. 382/306 |
| 5,862,260 * | 1/1999 | Rhoads .............................. 382/232 |
| 5,862,270 | 1/1999 | Lopresti et al. .................... 382/306 |
| 6,006,993 * | 12/1999 | Dickson et al. ............... 235/462.25 |
| 6,014,464 * | 1/2000 | Kurzweil et al. .................... 382/233 |

* cited by examiner

Primary Examiner—Bhavesh Mehta
Assistant Examiner—Ali Bayat
(74) Attorney, Agent, or Firm—Amster, Rothstein & Ebenstein

(57) ABSTRACT

Inventive two-dimensional barcodes, each having encoded digital information in a bitmap representing preferably randomized encoded data bits, are printed onto a printed medium. Preferably, error correction codes are added to the digital information to ensure that the decoding process accurately reproduce the digital information. In one embodiment, the bitmap may further include "anchor" bits in each corner, which are used as part of the skew estimation and deskewing processes during decoding. In a second embodiment, no "anchor" bits are required. The encoded digital information is mapped into the two-dimensional barcode in such a way as to minimize the errors caused by damage to particular rows and/or columns, for example, row damage caused by faxing the printed barcode. To extract the encoded digital information from the printed medium, the printed medium is scanned, then the bitmap is located within the printed medium. The skew of the bitmap, if any, is determined, and the bitmap is deskewed if necessary. The bitmap is then cropped, and the randomized digital information is read from the bitmap. The digital information is derandomized and any error correction codes are removed, in the process correcting and/or recording any errors discovered, thereby reproducing the original encoded digital information.

10 Claims, 14 Drawing Sheets

BORDER-LESS CLOCK FREE TWO-DIMENSIONAL BARCODE AND METHOD FOR PRINTING AND READING THE SAME

FIELD OF THE INVENTION

The invention relates generally to two-dimensional barcodes, and, more particularly, to a robust clock free two-dimensional barcode symbology, encoding information formatted in such barcode symbology, printing the barcode symbology onto a printed medium, and decoding the same.

BACKGROUND OF THE INVENTION

Contrary to the frequent predictions that we will one day live in a "paperless society", paper, and other printed mediums, are playing an increasingly important role as an inexpensive, effective and convenient means for communication. A fundamental limitation with paper, however, is that from a computer standpoint, it is currently an output-only format. While paper may be the preferred medium for displaying information for human use, it is difficult, if not impossible, for a computer to recover data reliably once it has been printed. Optical character recognition (OCR) attempts to solve this problem in a relatively simple domain, such as text rendered using standard fonts, but has met with only limited success thus far. While accuracy rates of ninety-nine (99%) percent are perhaps achievable and may seem impressive, a page with 3,000 characters will still incur an average of thirty (30) OCR errors and hence requires expensive and time consuming manual post-processing.

Another approach uses computer readable barcodes which may be included directly on paper (or other printed medium such as microfilm). Once encoded, such barcodes can be used by the computer to recover information evident to the human reader but difficult for a computer to recognize (e.g., printed text), information implicit to the creation of page but essentially invisible to the human reader (e.g., spreadsheet formulas), or any other information desired, whether or not dependent on the actual character text on the paper.

Computer readable barcodes, wherein digital data is recorded directly on paper, are known and have been utilized to provide document or product identification given a fixed set of values using simple numeric encoding and scanning technologies. Document or product identification systems which have been employed in the past include barcode markers and scanners which have found use in a wide range of arenas. With respect to paper documents, special marks or patterns in the paper have been used to provide information to a related piece of equipment, for example the job control sheet for image processing as taught by Hikawa in U.S. Pat. No. 5,051,779. Similarly, identifying marks comprising encoded information have been printed on the face of preprinted forms as described in U.S. Pat. No. 5,060,980 to Johnson, et al. The Johnson, et al. system provides for a user entering hand drawn information in the fields on a paper copy of the form and then scanning the form to provide insertions to the fields in the duplicate form that is stored electronically in the computer. Still another system is described in U.S. Pat. No. 5,091,966 of Bloomberg, et al., which teach the decoding of glyph shape codes, which codes are digitally encoded data on paper. The identifying codes can be read by a computer and thereby facilitate computer handling of the document, such as identifying, retrieving and transmitting such document.

Besides the various shaped barcodes described above, two-dimensional barcodes called "data strips" having a plurality of rows of "data lines" that represent information digitally encoded on printed media are also known in the art. Each data line row consists of a series of black and white pixels each representing binary "0"s and "1"s. The ordering of the bits in each row determines the digital data stored therein. The data stored within the totality of the rows define the data contained in the two-dimensional barcode. Typically, to read the barcode, the user passes a hand scanner, which simultaneously reads the information in each data line row, vertically along the length of the barcode to read all of the data line rows.

An example of a prior art system using a data strip two-dimensional barcode having rows of data lines with paper media, is found in U.S. Pat. Nos. 4,692,603, 4,754,127 and 4,782,221 of Brass, et al. In this system, two-dimensional barcodes consist of data line rows which are used to encode computer programs and data on paper and are scanned by use of a hand scanner. In addition to encoding the computer programs and data, these data lines also contain tracking and synchronization bits, hereinafter referred to as "clock bits". The requirement for use of numerous clock bits directly within each data line row, significantly reduces the amount of digital data that can be stored within each row. Further, if data line rows having clock bits are damaged, which is common if such barcodes are photocopied or transmitted by facsimile systems, such clock bits would be lost making it difficult, if not impossible, to decode the information encoded in the barcode.

U.S. Pat. No. 5,083,214 of Knowles describes a two-dimensional barcode system that also requires embedding clock bits within the encoded data itself. However, instead of encoding every row and column of data with synchronization and clock bits, the Knowles '214 patent uses the uppermost row in a data barcode to provide synchronization during scanning. Further, the first eight left most columns of bits comprise clock bits that are used for establishing the clocks to read the data bits contained in each row. Since the uppermost row and all eight left-most columns of the two-dimensional barcode, described in the Knowles '214 patent, are used solely for synchronization and clocking, the overall data capacity of the barcode is proportionally decreased. Furthermore, if the uppermost row or left most columns of the barcode are damaged, clock information will be lost making it difficult, if not impossible, to read out the data encoded in each data row as with other prior art systems.

U.S. Pat. No. 4,924,078 to Sant'Anselmo et al. describes a two-dimensional barcode system in which an orientation and/or timing cell border is included within the body of the barcode itself. For all cases in which the exact location, symbol size and data density are not known in advance of reading the barcode, the border is required by the Sant'Anselmo '078 patent and must be smooth and on at least two sides of the data area. In addition, timing cells are required when certain information is not a priori known, such as the number of cells per side. Here again, because the orientation and/or timing cell border is included within the barcode itself, the overall data capacity of the barcode is proportionally decreased. Furthermore, because critical information about decoding the barcode is extracted from the orientation border, damage to a single row or column of the embodiment of the Sant'Anselmo '078 patent in which the border is present on only two sides also makes it difficult, if not impossible to read out the data encoded within the barcode.

In co-pending patent application "A Clock-Free Two-Dimensional Barcode and Method for Printing and Reading the Same", (Ser. No. 08/569,280, filed Dec. 8, 1995) ("the '280 application"), the contents of which are explicitly incorporated by reference herein, a clock-less two-dimensional barcode with a border on at least one of the four sides of the barcode is described, which border is placed outside the confines of the barcode itself. The two-dimensional barcodes are called "PanaMarks"®. As depicted in FIG. 1A, PanaMark 10 is printed in the low right hand corner of printed page 11, although this position is completely arbitrary. In the embodiment depicted in FIG. 1A, the remaining portion of printed page 11 is occupied by printed text 12. However, as one skilled in the art will appreciate, any type of computer-generated printed material, for example a spreadsheet or graphics, can be substituted for the printed text 12. The PanaMark 10 depicted in FIG. 1B includes a border 13 that is present on all four of its sides. Although, as is fully described in the '280 application, the border 13 is only needed on one of the four sides of the PanaMark 10, for aesthetic reasons it is typically included on all four sides.

It is therefore an object of the present invention to provide a clock free two-dimensional barcode representing digitally encoded data.

It is an additional object of the present invention to provide a border-less clock free two-dimensional barcode representing digitally encoded data.

Another object of the invention is to provide a borderless clock free two-dimensional barcode printed on a printed medium that is sufficiently robust to withstand damage to the medium.

A further object of the invention is to provide a border-less clock free two-dimensional barcode representing digitally encoded data, without the need for any internal blocks used for alignment purposes.

It is yet another object of this invention to encode information formatted in a border-less clock free two-dimensional barcode for printing on a printed medium.

An additional object of this invention is to provide a method of decoding information digitally encoded in the form of a border-less clock free two-dimensional barcode printed on a printed medium.

Various other objects, advantages and features of the present invention will become readily apparent from the ensuing detailed description and the novel features will be particularly pointed out in the appended claims.

SUMMARY OF THE INVENTION

These and other objectives are realized by a two-dimensional data barcode having encoded digital information in a bitmap formatted representation of randomized data bits having a selected pixel row and column length, with no border surrounding the barcode.

In one embodiment of this invention, a two-dimensional data barcode has encoded digital information in a bitmap formatted representation of randomized data bits having a selected pixel row and column length, with "black" data pixels in each corner and no border surrounding the barcode. In another embodiment of this invention, there is no requirement that "black" data pixels occupy each corner of the barcode.

As a further aspect of this invention, a method of encoding information, for printing on a printed medium, such as paper, is described. Information is first converted into a data stream having a sequence of binary characters representing data bits. The data stream is then randomized to produce approximately an equal number of "0" and "1" characters. Thereafter, the randomized data stream is formatted into a two-dimensional bitmap of rows and columns and printed onto the printed medium.

In another aspect of the invention, information is converted into a data stream having binary characters representing data bits. The data stream is mapped to produce digital data bits arranged in a two-dimensional bitmap of rows and columns having the four corner locations vacant. The four corner locations are set to the logical character representing a "black" data pixel.

Another aspect of this invention relates to a method for mapping the data stream representing the information to be encoded to produce digital data bits arranged in a two-dimensional bitmap of rows and columns such that each data bit of a given block is separated from every other data bit within the same block by at least one row and one column, which ensures that the bitmap is robust with respect to row and column damage.

As a further aspect of this invention, a method for ensuring that the information encoded into the two-dimensional barcode is adequately randomized is presented. A number of alternative keys are available for randomization during the encoding process, so that if a first key does not produce an adequate level of randomization, a second key can be used. This process of testing additional keys continues until the randomization reaches a predefined level. During decoding, the error correcting code is used to select the most appropriate key for derandomization, as the improper key will produce excessive errors.

Preferably, in all embodiments of the two dimensional barcodes of this invention, the encoded information printed on the printed medium is randomized to safeguard against strings of contiguous pixels being the same color which may occur without randomization.

In another embodiment of this invention, information printed on a printed medium in the form of a two-dimensional bitmap of rows and columns of data pixels representing encoded data bits is decoded. The printed medium contains other information in addition to the bit-map. The printed medium on which the bitmap is printed is scanned, and the bitmap is located within the printed medium. The skew angle of the bitmap is determined with respect to the origin of the scanned printed medium, and if the angle is too large, the bitmap is deskewed. Once the bitmap is correctly aligned, it is cropped and the binary data from the data pixels is read to produce a two-dimensional digital array corresponding to the encoded data bits and corner bits, if present, respectively.

In a further embodiment of this aspect of this invention, a method of ensuring that the data is properly read from the deskewed, cropped bitmap is presented, whereby four alternative data streams are created by reading the data in four alternative directions, and the error correcting code is then used to select the data stream with the fewest errors for output.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

As fully described in U.S. Pat. Nos. 5,625,721 and 5,703,972 to Lopresti et al. which are both entitled "Certifiable Optical Character Recognition" and in the copending patent application entitled "A Method and Means For Enhancing Optical Character Recognition of Printed Documents" (Ser. No. 08/138,467, filed Oct. 15, 1993), currently under allowance, the contents of which are all explicitly incorporated by reference herein, information about the contents, layout, generation and retrieval of a document can be encoded by a computer when initially generating the document or upon subsequent computer processing thereof. The encoded document information can then be provided via a data barcode, which is also referred to herein as a "PanaMark"®, generated on the face of a printed version of the document. Advanced encoding and print resolution capabilities presently available can accommodate up to 30,000 bits of information in a single square inch of space. Therefore, as taught by the above-referenced applications, one can theoretically encode the entire document contents, limited only by the amount of space on the document face that one is willing to sacrifice to the PanaMark. A barcode scanner, in conjunction with or wholly separate from an optical page scanner, can scan the PanaMark and provide the information to an associated system equipped with the appropriate recognition and decoding software. The decoded information can then be used by the scanning system to create a new version of the document or to enhance the recognition, reproduction and error correction for the scanned document. To decode the PanaMark, it is not required that such barcode scanner and scanning system know the printing resolution of the PanaMark, provided that the scanning resolution of the scanner is at least as fine as the printing resolution of the PanaMark, so that each individual 1×1 or larger pixel of the PanaMark, representing a logical bit, can be scanned.

The information encoded in the form of a PanaMark can be used to enhance the software tools already used to create paper documents. Examples include word processors, spreadsheets, object-oriented graphics, and multimedia applications, such as voice recording and photographic imaging.

Figure 1A:
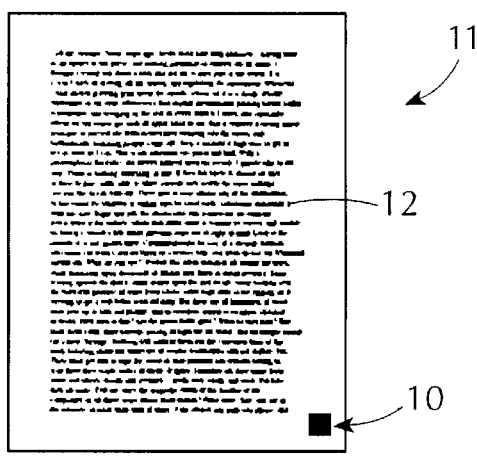
FIG. 1A is a diagram schematically illustrating the two-dimensional barcode of the '280 application printed on a page of printed text.
Figure 1B:
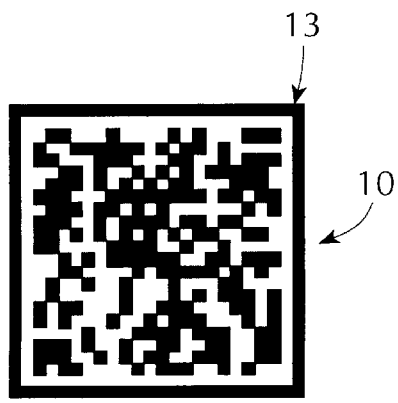
FIG. 1B shows an example of the two-dimensional barcode of the '280 application.

The border 13 used in the PanaMark 10 of FIG. 1 was not a critical feature of the invention disclosed in the '280 application, as most of the key procedures described therein work whether or not a border is present. However, the border 10 was used in the '280 application by the skew estimation and deskewing steps.

Figure 2:
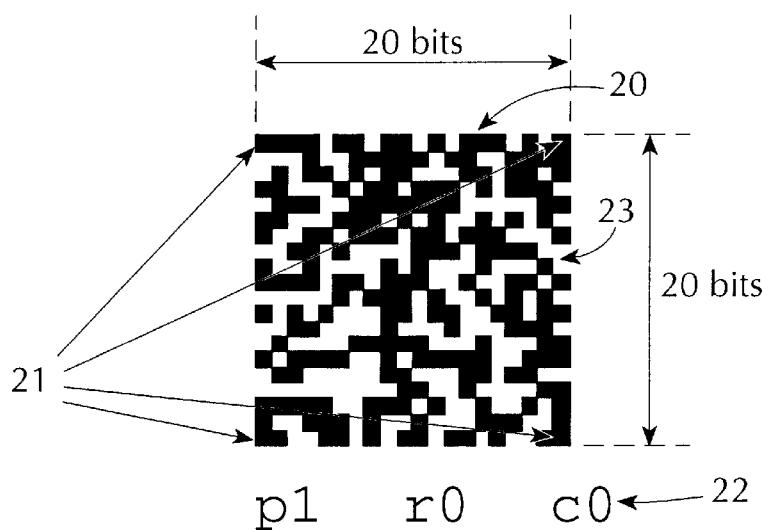
FIG. 2 shows an example of a two-dimensional barcode in accordance with the present invention.

FIG. 2 illustrates an example of the new PanaMark symbology. PanaMark 20 comprises an encoded set of data bits in a two-dimensional grid. Typically, each data bit which is encoded is printed as a matrix of black or white pixels 23. Preferably, a pixel matrix representing one data bit is square and may be as small as a 1×1 matrix to as large as a 6×6 matrix or more. Non-square matrices may also be used. There are no clocks or borders needed or required in the symbology for PanaMark 20. In the preferred embodiment, the PanaMark 20 is a 20×20 array of data bits, although it can be recognized that the size is flexible and that the only requirement on the size is that the reading process know the size of the encoded array. In some applications, it may be desirable to include a text label 22 adjacent to the PanaMark 20, although optional and of no significance to either the encoding or decoding process.

Two different embodiments are described herein. In the first embodiment, the four corner bits 21 are always black and are necessary for the template matching skew estimation process discussed in greater detail with respect to FIG. 10. The four corner bits 21 in the first embodiment are called "anchor" bits. The remaining data bits in the first embodiment are pseudo-randomized and can hold any combination of desired information and error correction bits. The symbology of the first embodiment provides for good skew estimation when the skew is small and the PanaMark 20 is free from any damage. However, the placement of the anchor bits 21 in the corner makes them susceptible to damage. Thus, in the second embodiment, there is no requirement for any anchor bits 21 and the PanaMark 20 is simply a N×M array of data bits, preferably with N=M=20. In the second embodiment, all of the data bits are pseudo-randomized and can hold any combination of desired information and error correction bits.

Figure 3:
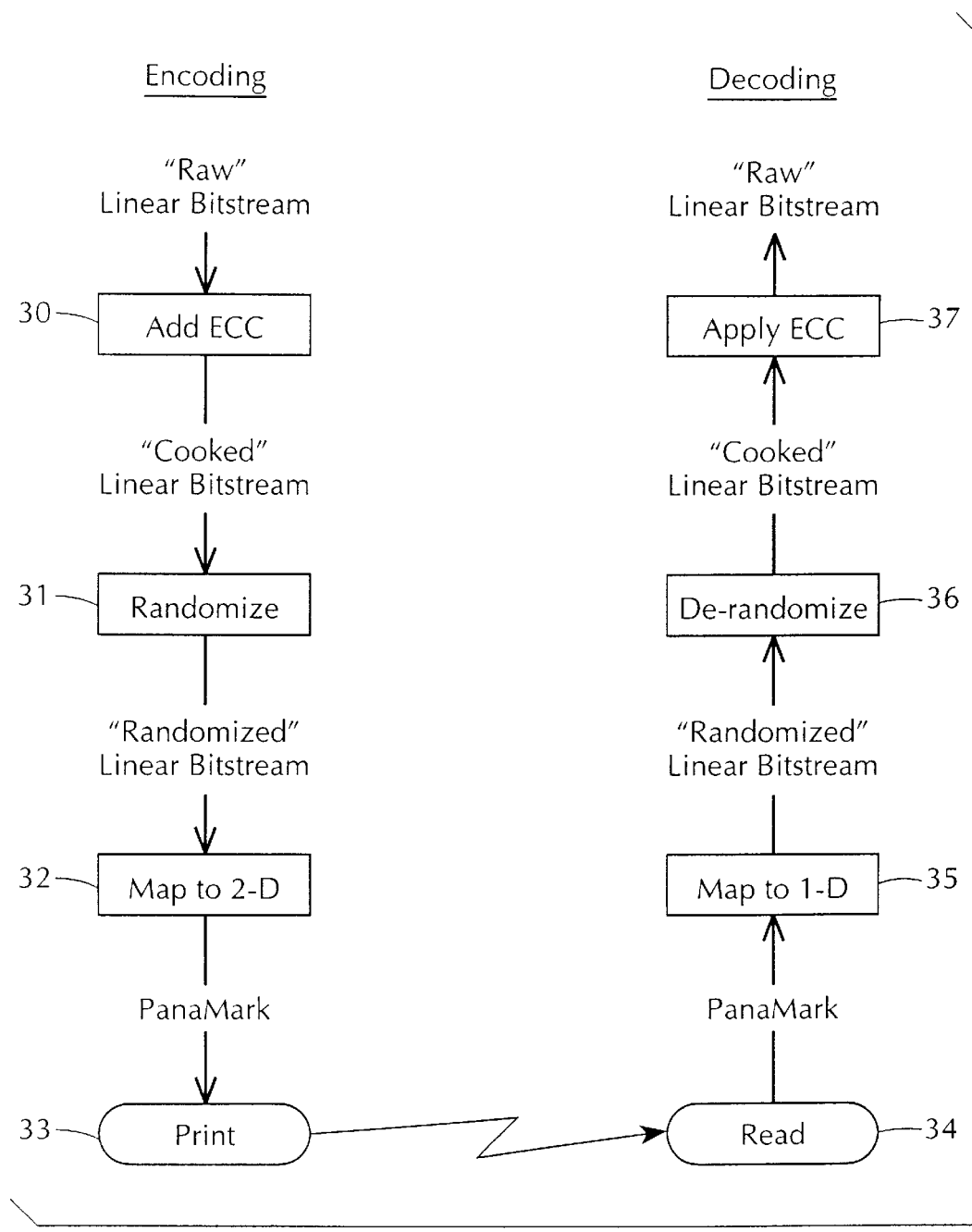
FIG. 3 is a flow chart showing the steps for encoding and decoding information onto a printed medium in accordance with the present invention.

FIG. 3 illustrates the steps involved in the encoding/decoding process. Except as discussed herein, each of the steps are more particularly described in the '280 application. During the encoding process, input data in the form of a one-dimensional linear bitstream is first processed to add a standard, block-based error correction code ("ECC") at step 30, randomized at step 31, mapped from a one dimensional bitstream to a two-dimensional representation, the PanaMark, at step 32, and the PanaMark is finally printed at step 33. The decoding process repeats these steps in reverse order, the printed PanaMark is read at step 34, mapped from a two-dimensional to one-dimensional representation in step 35, derandomized at step 36, and finally the ECC is applied at step 37 to recreate the "raw" linear bitstream. As part of the new PanaMark symbology presented herein, improved methods for randomizing, mapping, reading, and applying the ECC are also presented.

Any ECC can, of course, be implemented in a manner which allows some number of bit errors to be corrected. While such errors are generally unavoidable, the method by which data is mapped into two dimensions can be chosen to minimize the impact of certain kinds of errors on the readability of the PanaMark as a whole. The bits are mapped so that systematic damage to the mark is not likely to cause more than one bit error in each block, or codeword, which is what the ECC can correct.

Figure 4:
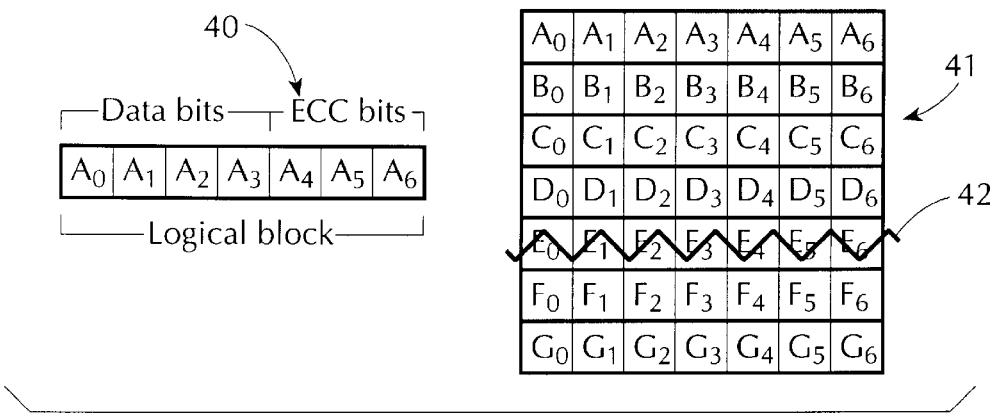
FIG. 4 shows an example of a bad data bit layout for the two-dimensional barcode.

One method, shown in FIG. 4, of placing the bits from a single block 40 sequentially in row- or column-major order within barcode 41, is a poor choice. When an image is scanned, it is not uncommon to see correlated damage along specific rows or columns of pixels, as depicted in row 42. In the case of flatbed scanners and fax machines, row damage arises as a result of physical motion; either the CCD sensor array being moved down the page, or the page being drawn past the stationary sensors. Any irregularity in this motion will lead to distortion across certain rows of scanned image. Note that row 42 experiences seven bit errors and hence is totally lost. On the other hand, column damage can occur when certain of the CCD sensors have gone bad, leading to black stripes running down the length of the page.

Figure 5A:
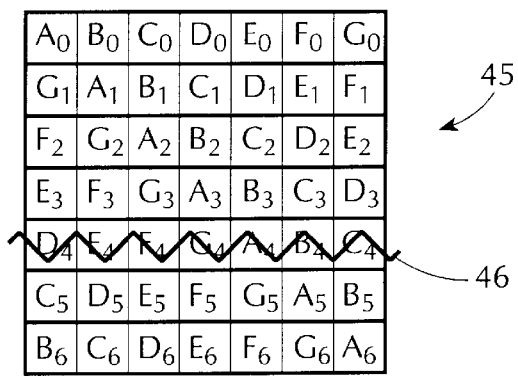
FIGS. 5A and 5B show an example of a better data bit layout for the two-dimensional barcode.
Figure 5B:
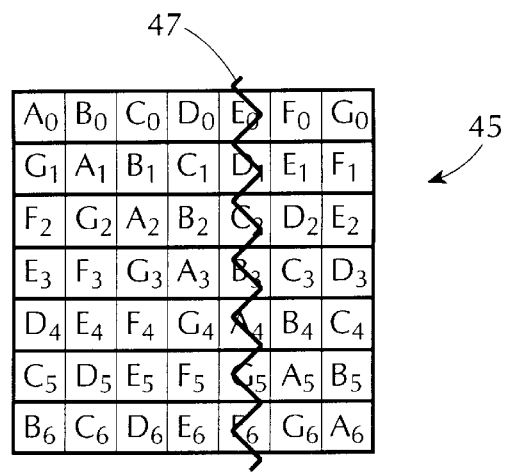

As shown in FIGS. 5A and 5B, a much better strategy is to place successive bits from a single block along diagonals within barcode 45. In this case, only one bit in each block is affected by damage to correlated row 46 or column 47. Since the ECC can correct one bit error per block, this means that all the blocks are decoded successfully. By mapping the blocks so that the damage is distributed uniformly across them, the overall robustness of the symbology is improved.

Figure 6:
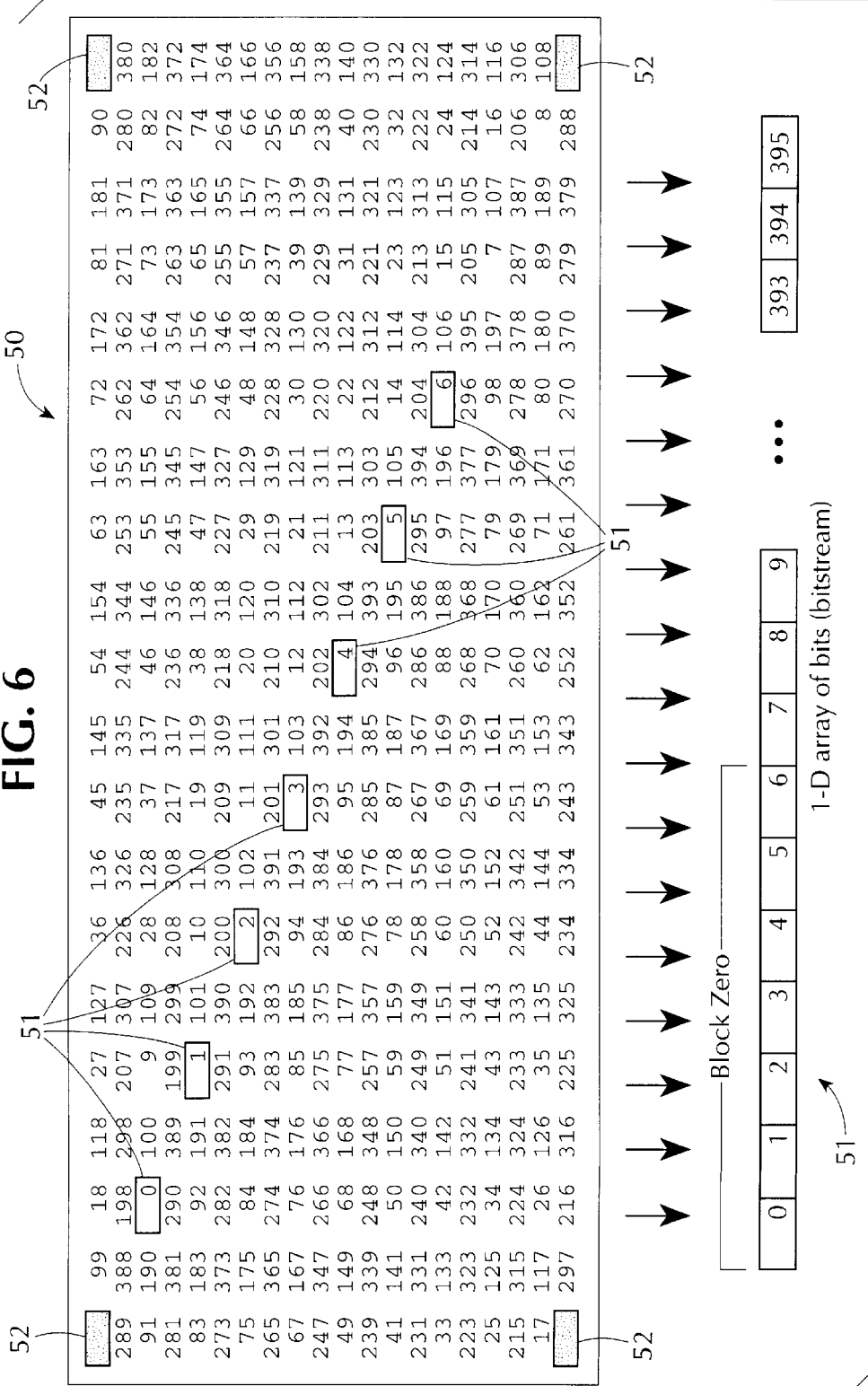
FIG. 6 shows an example of optimal data bit layout for the two-dimensional barcode in accordance with the present invention.

It is even more desirable if bits from a single block can be placed in non-adjacent rows and columns, because the noise effects described earlier could potentially straddle row or column boundaries. As long as the basic block size is less than half the dimension of the mark, this is possible. This is accomplished by the mapping process depicted in FIG. 6. The barcode 50 illustrated in FIG. 6 shows how block zero 51 is mapped on the major diagonal of logical PanaMark 50 with each bit separated by at least one row and one column.

Hence, even damage that destroys two adjacent rows or columns will not, by itself, prevent the correct decoding of all of the blocks. Although FIG. 6 depicts a logical PanaMark 50 with four anchor bits 52, it will be recognized that the anchor bits 52 are only necessary when the template matching skew angle detection method is used, as is discussed herein with respect to FIGS. 10A and 10B.

Figure 7B:
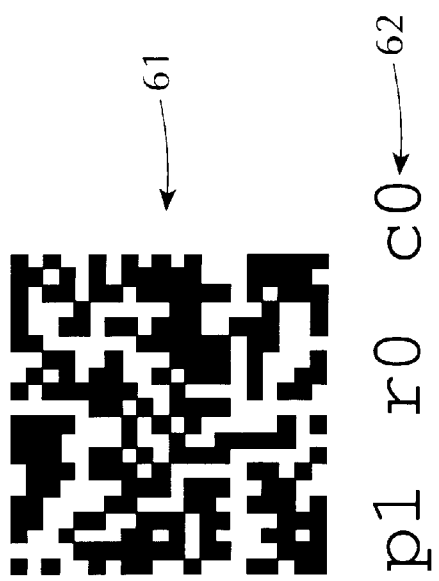
FIG. 7B shows an example of a randomized two-dimensional barcode with "GOOD" randomization results.
Figure 7A:
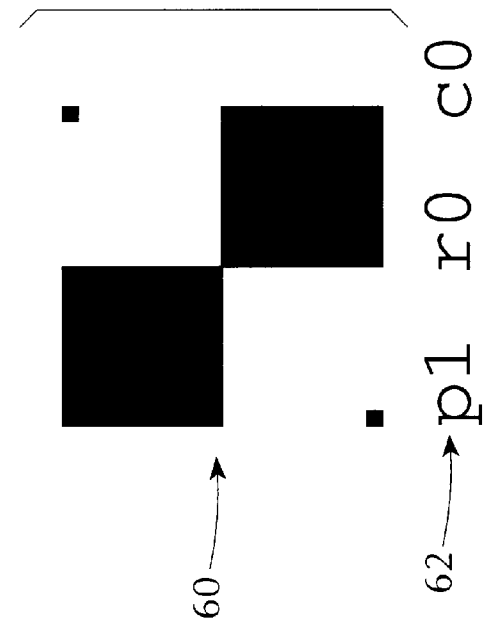
FIG. 7A shows an example of a randomized two-dimensional barcode with "BAD" randomization results.

In exchange for doing away with explicit clock borders, the reading procedure described in the '280 application requires the presence of sufficient edge transitions to synthesize the implicit clocks. Large areas of all-white or all-black pixels within the PanaMark are problematic, because of the consequent reduction in the number of edges. In practice, such regions might arise due to regular patterns in the underlying data unless steps are taken to prevent it. For instance, English text represented in standard 8-bit ASCII always has a '0' in the high-order bit position. FIGS. 7A and 7B give examples of a "bad" PanaMark 60 and a "good" PanaMark 61, respectively. Both PanaMarks 60 and 61 are shown with the optional text label 62. Note that PanaMark 60 is perfectly valid—it encodes the same number of bits as PanaMark 61. PanaMark 60 would, however, be impossible to read reliably using the techniques presented in the '280 application.

Such situations can be prevented from occurring by randomizing the input bitstream. This means that, on the decoding side, the bitstream must be de-randomized. This process should actually be called "pseudo-randomization" because it is always known how to undo its effects. A simple, well-known approach to implement randomization is to perform an exclusive "OR" ("XOR") operation on the input stream bit-by-bit with a predefined, randomly generated key. This has the effect of breaking up any regular patterns in the input stream, yielding a roughly uniform distribution of 0's and 1's. When encoded in the PanaMark, these correspond to white and black bits, respectively. In this way, the "good" PanaMark 61 is created which has sufficient edges for the implicit clocking necessary to read the data bits. The randomization step also gives the mark a nondescript, gray appearance that users may find less distracting than readily recognizable patterns.

During the decoding process, the output bitstream is de-randomized by XOR'ing it with exactly the same key. Hence, it is vital that the encoding and decoding procedures use the same key. It is possible, in rare cases, that the randomized bitstream will be degenerate such that it contains large white or black regions as illustrated by the "bad" PanaMark 60 of FIG. 7A. To avoid this scenario, the encoding procedure can optionally choose from among a small assortment of possible keys. The selection is guided by the quality (i.e., the randomness) of the output bitstream. Even though the decoding procedure cannot know a priori which key the encoding side has used, it is a simple matter to try each key and confirm the results using the output from the ECC process, i.e., the correct key will be the one that produces the fewest number of errors from the ECC process.

Figure 8A:
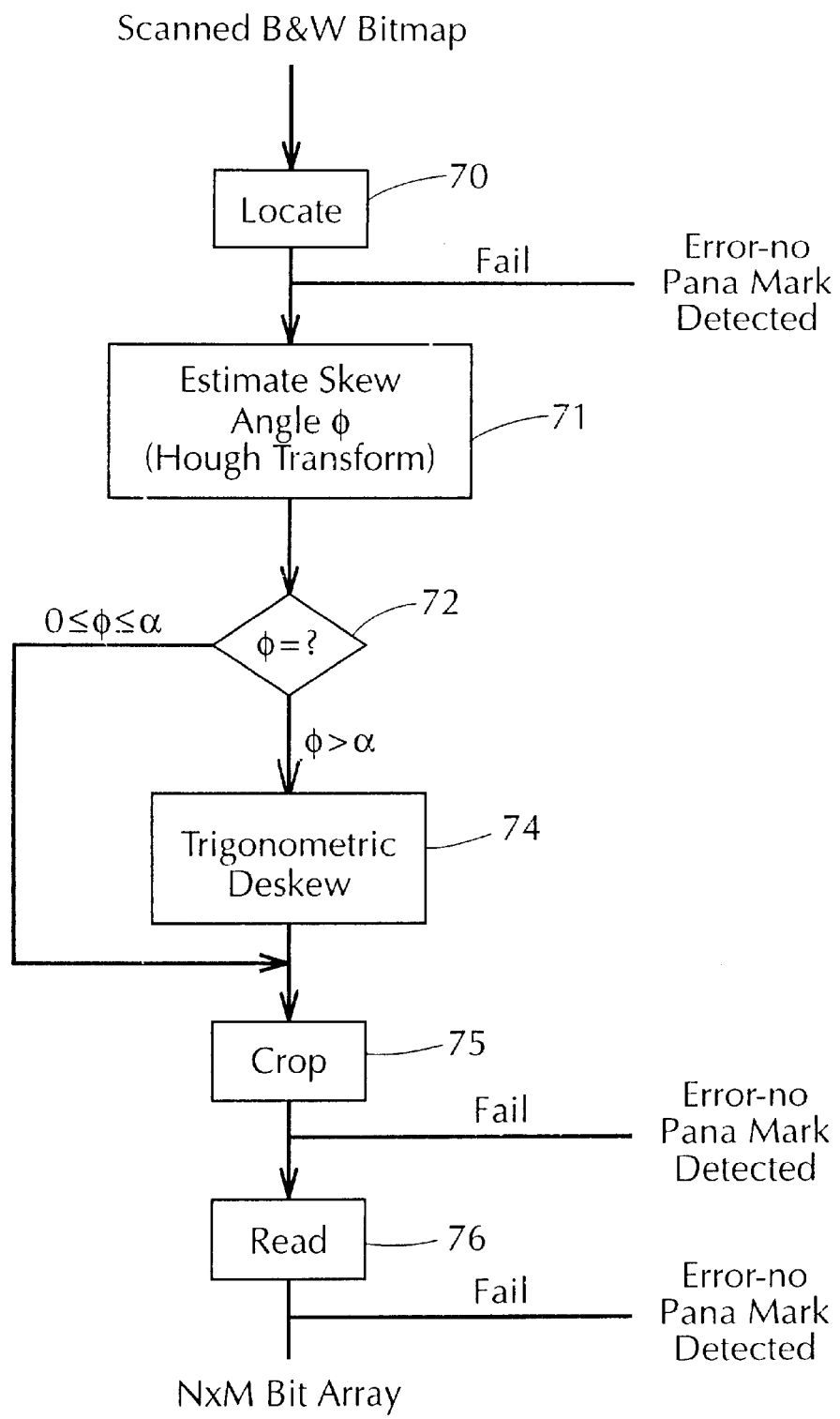
FIG. 8A is a flowchart describing how to read one embodiment of the two-dimensional barcode in accordance with the present invention.
Figure 8B:
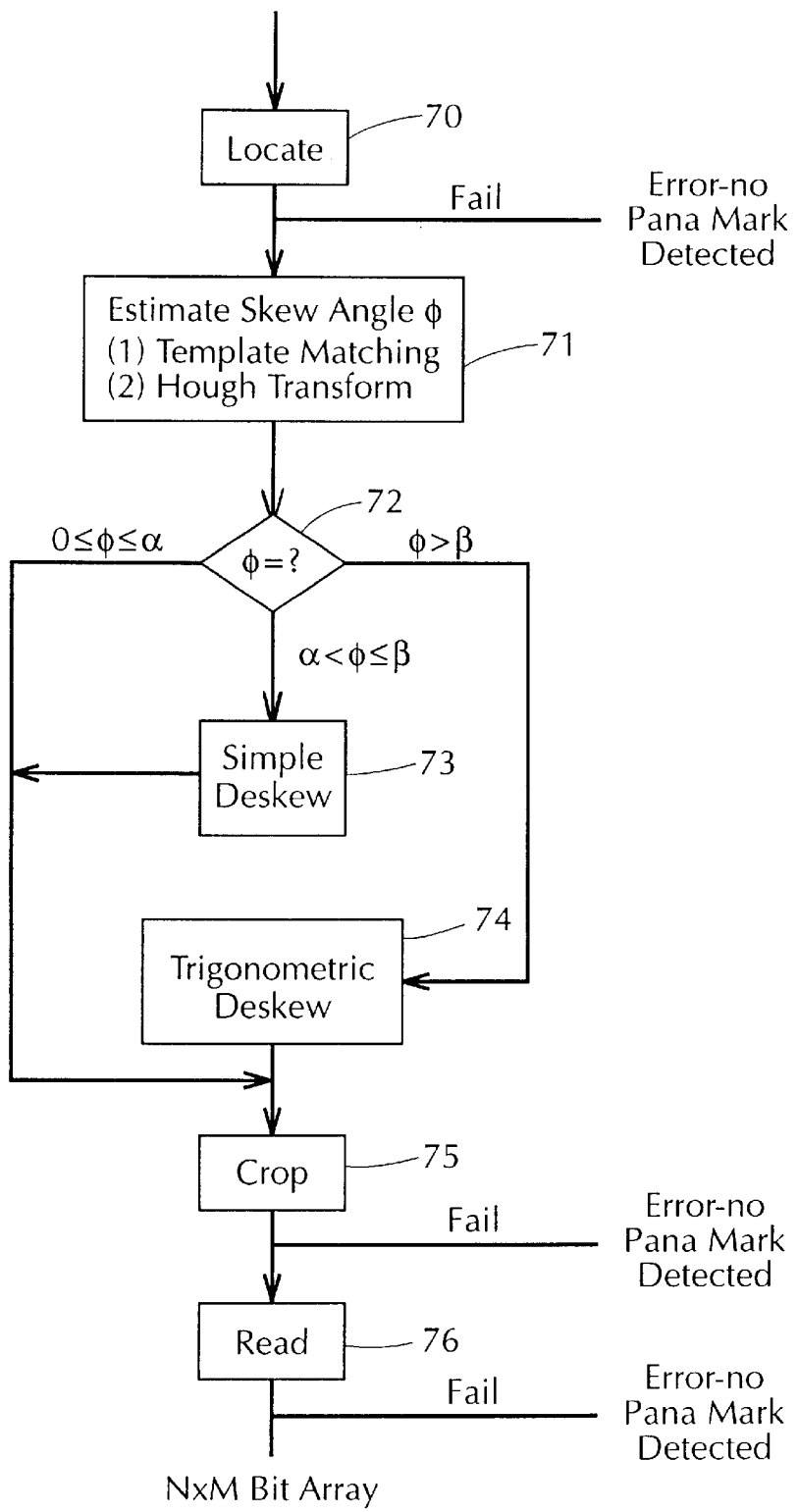
FIG. 8B is a flowchart describing how to read a second embodiment of the two-dimensional barcode in accordance with the present invention.

FIGS. 8A and 8B are flowcharts illustrating the reading procedures for the barcode symbologies presented herein. The method described by FIG. 8A is directed to the embodiment of the PanaMark in which no border or anchor bits are present, while the method described by FIG. 8B is directed to the embodiment of the PanaMark which includes anchor bits, but no border. Printing is handled by a complementary set of routines that are more straightforward as no image processing is involved, and are fully described in the '280 application.

In FIG. 8A, the first step 70 locates the PanaMark, which has no border or anchor bits, on the printed page. Under most circumstances, it is assumed that the region around the mark is relatively noise-free; ordinarily it is positioned in an unused corner of the page (as, for example, in FIG. 1A). As more particularly discussed with respect to FIGS. 9A and 9B, the locate step 70 operates by first calculating vertical and horizontal histograms of the number of black pixels in the scanned page. Because the scanned PanaMark is randomized and therefore has an approximately equal distribution of black and white pixels, it will have a greater number of black pixels than is normally present within the region of the document in which it is positioned. Each histogram is sequentially examined, row by row for the vertical histogram and column by column for the horizontal histogram, until a first predetermined level is reached. Next, the process "backs up slightly" until a second lower predetermined level is reached. This is selected as the first boundary. Then, moving forward from where the first predetermined level was first found, the histogram is examined to find the point where it drops below the first predetermined level. The process next "moves forward slightly" until the second predetermined level is reached, similar to the "backing up" process described above. This point is selected as the second boundary of the mark. By performing this process on both the horizontal and vertical histograms, a box bounding the PanaMark is selected. The "backing up slightly" and "moving forward slightly" steps ensure that the corners are not cut off, especially in the case of a skewed PanaMark.

In step 71 of FIG. 8A, the skew of the PanaMark is estimated using the "Hough Transform" procedure. This procedure is described in greater detail with respect to FIGS. 11–13. In this procedure, horizontal edges are first found for each row of logical data pixels. By using the Hough Transform, a representation for a line which is in parallel with the horizontal edges is found (which, if skewed, will not be purely horizontal), and the angle between this line and a purely horizontal line is calculated, giving the skew angle.

At step 72, the skew angle is evaluated. If the skew angle $\phi$ is below a certain predetermined threshold $\alpha$, no deskewing is required, and the cropping step 75 is performed next. If the skew angle $\phi$ is greater than the predetermined angle $\alpha$, then the trigonometric deskew step 74 is performed next. As is more particularly described with respect to FIG. 17, once the skew angle is known, it is possible to calculate the position of the deskewed image mathematically based upon the skewed image.

Once the deskewing, if any, is completed, at step 75 a tight bounding box is cropped around the PanaMark, which is now oriented with clean horizontal and vertical edges. The cropping step is performed in a manner much like the locate step 70, but with tighter tolerances. Finally, at step 76, the bits are read out, yielding an N+M bit array (20×20 bit in the preferred embodiment). The read process 76 is more particularly described in the '280 application and with respect to FIG. 18.

Figure 9B:
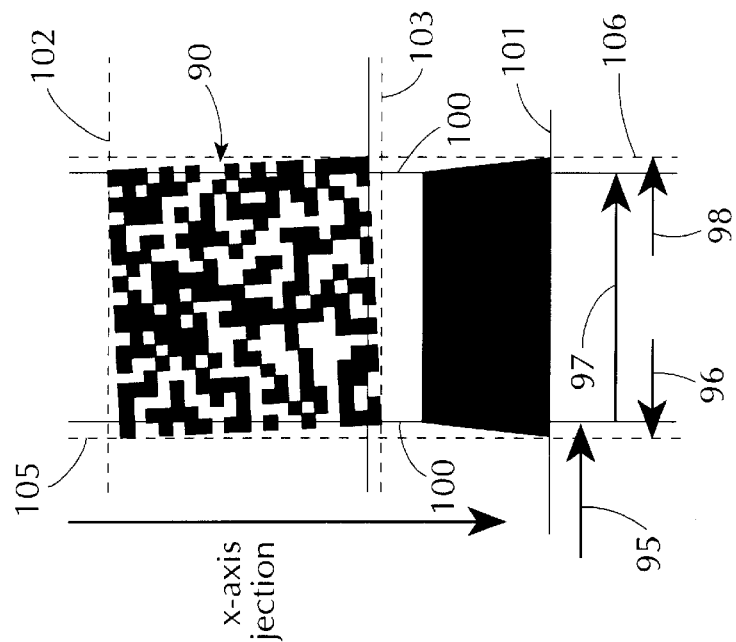
FIGS. 9A and 9B illustrate how the two-dimensional barcode is located within the printed page in accordance with the present invention.
Figure 9A:
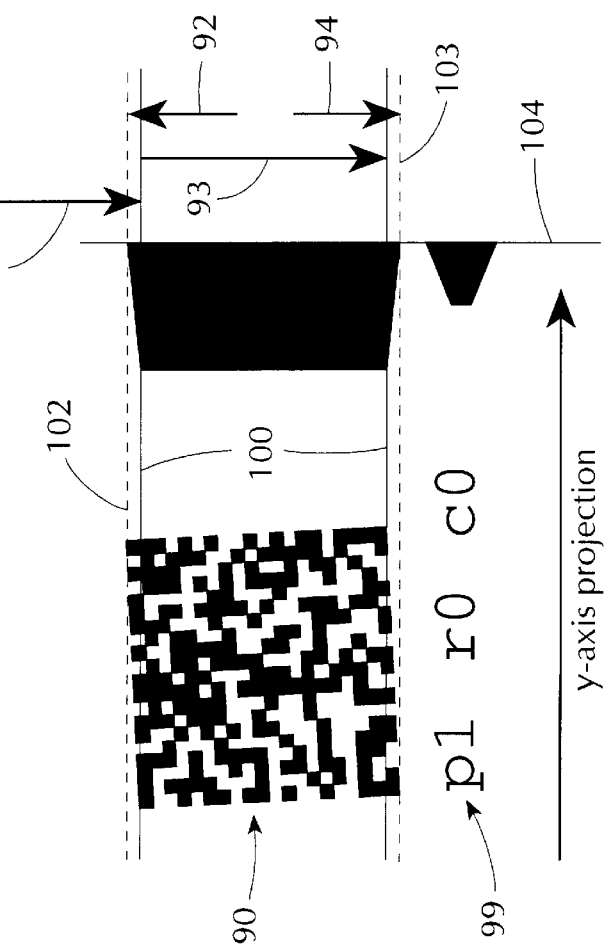

In FIG. 8B, the first step 70 locates the PanaMark, which has anchor bits but no border, on the printed page, in the same manner as is generally described above and more particularly described with respect to FIGS. 9A and 9B. As previously mentioned with respect to FIG. 8A, it is assumed that the region around the mark is relatively noise-free.

In step 71, the skew of the PanaMark is estimated. Two alternative methods for estimating the skew are described herein. The first method is a "template matching" procedure which is only effective for small angles of skew (it is not used in FIG. 8A because it requires that the PanaMark to be decoded have anchor bits in each corner), which is more particularly described with respect to FIGS. 10A and 10B. Generally, this process operates by aligning two templates closely to two adjacent corners of the PanaMark, for example, the left top corner and the left bottom corner. Each template forms a right angle and preferably has an inner row of black bits and two outer rows of white bits. Each template is moved bit by bit towards the respective corner, until the closest possible match is found, aligning the inside row of black bits with the respective corner. Although the PanaMark may be skewed, each template remains aligned vertically and horizontally as it is matched with the respective corner. Once the closest match is found for each corner, if the PanaMark is skewed, the black corner bits of each template will not be aligned vertically. The angle between the vertical (or horizontal, if the top left and top right corners were selected instead) line extending from the corner bit of the first template, and the line extending from the corner bit of the first template to the corner bit of the second template represents the skew angle, and can be calculated by simple trigonometric methods.

Figure 11:
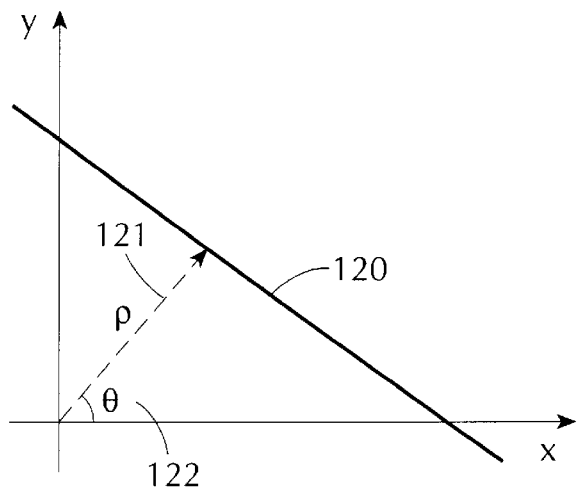
FIG. 11 illustrates a parametric representation of a straight line.

In the second method, the "Hough Transform" is used to calculate the skew angle. This method, which is generally described above with respect to FIG. 8A and more particularly described with respect to FIGS. 11–13, is effective for a larger range of skew angles (and does not require that the PanaMark have anchor bits). The choice of template matching procedure is a tradeoff between the amount of skew to be corrected and the processing time allotted, because the Hough Transform procedure requires more processing time. If skew angles greater than can be detected using the template matching procedure are expected, the Hough Transform method should be used. If processing time is at a premium, and smaller skew angles are expected, the template matching procedure should be used. In step 72, the skew angle is evaluated. If the skew angle $\phi$ is below a certain predetermined threshold $\alpha$, no deskewing is required, and the cropping step 75 is performed next. If the skew angle $\phi$ is greater than the predetermined angle $\beta$, then the trigonometric deskew step 74 is performed next, as is generally described with respect to FIG. 8A, and more particularly described with respect to FIG. 17. If the skew angle $\phi$ is between predetermined angles $\alpha$ and $\beta$, then the simple deskew step 73 is performed next. The simple deskew method uses a shear rotation technique. In this process, one corner bit, for example, the upper left corner bit is assumed to be correctly positioned. Based upon the skew angle, each row is sequentially examined to determine the number of pixels to be shifted, right to left for example. Each column is likewise sequentially examined, to determine the number of pixels to be shifted, top to bottom for example. Next, the pixels are shifted as designated in each row, the finally the pixels are shifted as designated in each column.

As described with respect to FIG. 8A, once the deskewing, if any, is completed, a tight bounding box is cropped around the PanaMark at step 75 and the bits are read out at step 76, yielding an N×M bit array (20×20 bit in the preferred embodiment).

It is possible, at various steps in the process, to check assertions as to whether a valid PanaMark has been detected. For example, the PanaMark is expected to fall within a certain size range, and to obey specific properties with respect to its texture (roughly 50/50 black and white). In FIGS. 8A and 8B, error checking is shown with respect to the locate step 70, the crop step 75 and the read step 76. In later stages, after the read step 76, the ECC can also be used to confirm validity. If at any point an expected characteristic is not found, there are two options: (1) back up and try a different approach, or (2) abort further processing. Note that it is critical for the default steps to be very fast. Only when special processing is required should more time be granted to read the PanaMark. This is why in FIG. 8B there are two alternative methods presented for performing the deskew step, the trigonometric deskew step 74 is used only when necessary, and normally the simple deskew step 73 is used, which operates more quickly than the more complicated trigonometric deskew step 74. However, as shown in FIG. 8A, for the PanaMark without anchor bits, only the more complex procedures for estimating skew angle can be used.

FIG. 9 illustrates the two steps that are required to carry out the locate step 70. The goal of the locate step 70 is to find a bounding box for the PanaMark that is assumed to be somewhere in the input image, for example, PanaMark 10 shown in FIG. 1A in the lower right corner of document 11. Normally, the PanaMark is the only object present at that particular position on the page, other than an optional text label. In the event the PanaMark is embedded within the content of the image, or other large components are present in the input image, more sophisticated procedures based upon morphological operations and statistical analysis must be used. Such cases are likely to be rare in practice, however. During this process, it must be anticipated that there will be a small amount of "speckle" noise and that the entire image may be skewed.

The locate process illustrated in FIG. 9 is based on y-axis and x-axis projections. First, with reference to FIG. 9A, the vertical extent (i.e., the top and bottom boundaries) of the PanaMark 90 is determined. To that end, the number of black pixels in each row of the input image on which the PanaMark 90 is printed is summed, creating a y-axis projection 104. Processing proceeds from top to bottom on the y-axis projection 104. In the embodiment shown, the label is below the PanaMark, although as one skilled in the art can understand, if present, it can be located on any one of the four sides of the PanaMark 90. A minimum threshold 100 is set so that small amounts of spurious noise are ignored. When a row is found that meets the minimum threshold 100, shown by point 91, the threshold is reduced slightly and the top boundary 102 is found by moving backwards in the histogram 104 until the reduced threshold is met (point 92). This "reducing" of the threshold 100 prevents the chopping off of the corners of the PanaMark, in the event that the mark were skewed and the threshold set too tight. Next, processing continues downward, as shown in point 93, until the histogram 104 falls below the minimum threshold 100. At this point, the threshold is reduced by the same amount as before to establish the bottom boundary 103 at point 94, although here the processing continues downward, instead of moving backwards.

Once the correct vertical extent has been determined (effectively eliminating the label), a similar operation is performed to determine the horizontal extent (i.e., the right and left boundaries) of PanaMark 90. Black pixels are summed for each column across the currently active rows to create x-axis projection histogram 101. Processing proceeds from left to right. At point 95, the processing stops when the minimum threshold level 100 is met. The threshold is then reduced slightly, and the left boundary 105 is selected by moving backwards along histogram 101 until the reduced threshold is met at point 96. Then, processing continues from point 95, where the minimum threshold level 100 was found, now looking for a level less than the threshold 100. Once this is found at point 97, the threshold is again reduced by a set amount, and the right boundary 106 is selected at point 98 by continuing to move left to right until the reduced threshold is found. Of course, the order of finding the vertical and horizontal boundaries of the PanaMark can be reversed.

After the locating process is completed, it is assumed that an accurate bounding box for the PanaMark has been determined, which can be confirmed in a number of ways, e.g., the ECC process.

Once the PanaMark is located within the page, it is necessary to estimate its skew angle, if any. This is required because later processing steps (i.e., reading) depend on the mark being nearly perfectly straight. Even though the user may be careful when placing the page on the scanning device, small amounts of skew can still arise. Once the amount of skew is known, a deskewing step can be applied to properly align the PanaMark. Two alternative methods are presented herein for estimating the skew angle, as described with respect to block 71 of FIG. 8. The simpler method, which requires that the PanaMark include anchor bits, is the template matching skew estimation procedure. The template matching skew estimation procedure requires much less processing time than the more complex Hough Transform procedure, but only the Hough Transform procedure can be used to calculate the skew angle of PanaMarks without anchor bits.

FIG. 10 illustrates the template matching procedure for skew estimation (step 71 of FIG. 8B), which works reliably for small skew angles, such as are encountered when the user exercises reasonable care in placing the page containing the PanaMark 110 (with four anchor bits) on the glass of the scanning device, or when a scanning device incorporating an automatic sheet feeder is used to scan the page containing the PanaMark 110. As previously mentioned in conjunction with step 71 of FIG. 8B, skew angles too large to be determined by the template matching procedure can be calculated using the Hough Transform technique to be described in conjunction with FIGS. 11–12.

Figure 10B:
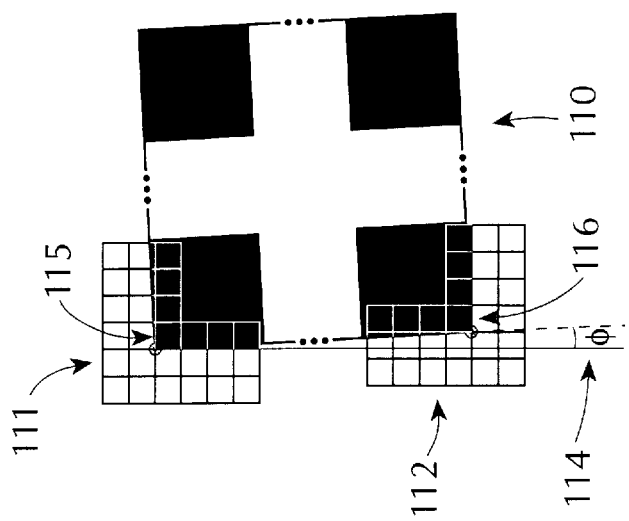
FIGS. 10A and 10B illustrate how the skew of the two-dimensional barcode is calculated in accordance with one aspect of the present invention.
Figure 10A:
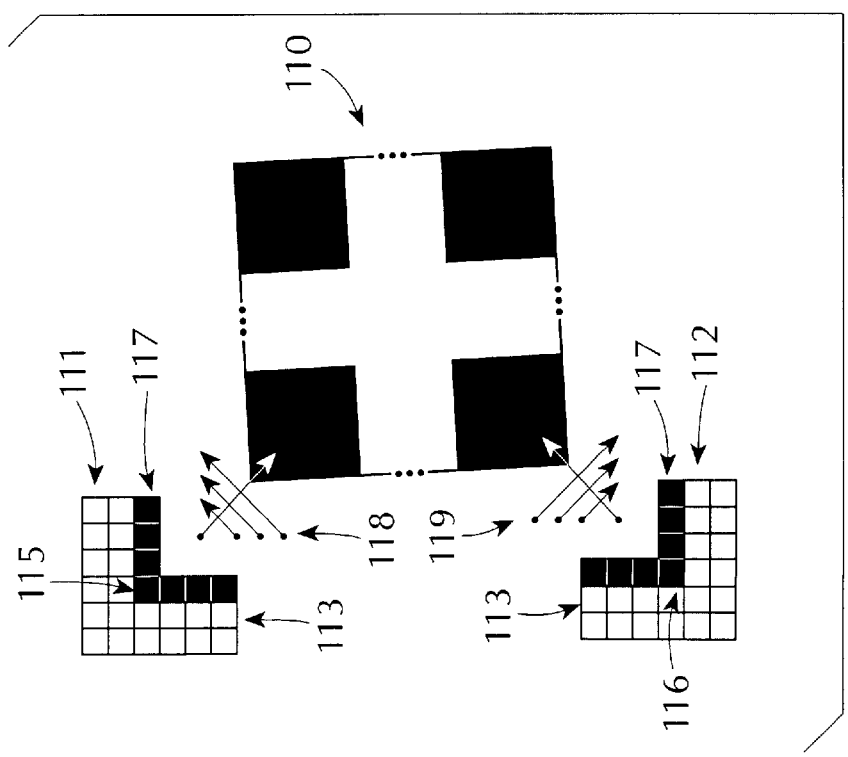

Referring to FIGS. 10A and 10B, templates 111, 112 are defined for the northwest (NW) and southwest (SW) corners of the PanaMark 110, respectively. Each template 111, 112 preferably includes one row of black pixels 117 and two rows of white pixels 113. As shown in the left portion of FIG. 10, each template 111, 112 is moved across the appropriate subregion of PanaMark 110 in a bitwise manner to locate the corners. This process is indicated by arrows 118 showing the movement of template 111 toward the northwest corner, and by arrows 119 showing the movement of template 112 toward the southwest corner. At each point of movement, a 2-D Hamming distance is computed as is well known in the art (i.e., the number of pixel locations in which the template and the image do not match), and each template 111, 112 is adjusted back and forth until this distance is minimized for each corner.

Once the templates 111, 112 are in their best-fit positions, the angle 114 between the corner pixels 115, 116 in the templates 111, 112 is determined as shown in FIG. 10B in a manner well-known in the art, thereby yielding an estimate for the skew angle $\phi$ of the PanaMark 110.

Note that while the anchor bits in the PanaMark 110 may be skewed, the templates 111, 112 are not (i.e., the templates are pre-defined, and the skew angle is not a priori known). For this reason the procedure is reliable only for small skew angles. The skew over a single bit is relatively minor compared to the skew over the entire dimension of the PanaMark 110. Hence, the templates 111, 112 will match well in their intended positions so long as the anchor bits in the image are not significantly distorted (i.e., the skew angle $\phi$ is not too large).

The Hough Transformation can also be used to determine the skew angle for levels of skew angle which the template matching procedure is incapable of handling and for PanaMarks without anchor bits. The Hough Transformation is one of the oldest and most robust methods used in image analysis and computer vision. It is a technique for detecting geometric features such as straight lines, circles, etc., in a digital image. The Hough Transformation is a parametric transformation which maps a set of points of a shape into a small set of parameters characteristic of that shape. For example, as shown in FIG. 11, points on a straight line 120 can be mapped to a pair of parameters ($\rho$, $\theta$) by its parametric equation:

$$\rho = x \cos(\theta) + y \sin(\theta)$$

where $\rho$, 121, is the normal distance to the line from the origin, and $\theta$, 122, is the angle of the normal of the line with the x axis.

Figure 12A:
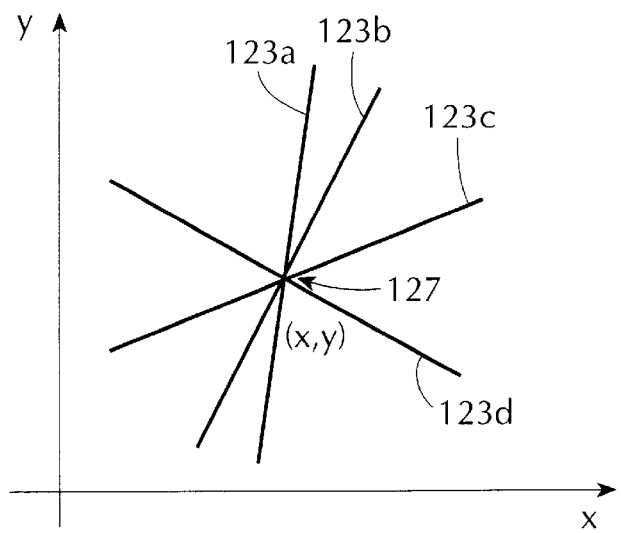
FIG. 12A and 12B illustrate representations of a single point within a plane, and two points within a plane, respectively.

The above correspondence between all points on a straight line and a parameter pair ($\rho,\theta$) assumes that ($\rho,\theta$) of the straight line is known. As shown in FIG. 12A, an arbitrary point (x, y) 127 in a plane, however, can be on an infinite number of straight lines, as depicted by lines 123a–123d. In other words, a point (x, y) 127 can be mapped to an infinite number of parameters ($\rho,\theta$). The set $F_{x,y} = \{((\rho, \theta) | 0 \leq \theta < 180°, \rho = x \cos(\theta) + y \sin(\theta)\}$ represents all straight lines passing through (x, y) 127.

Figure 12B:
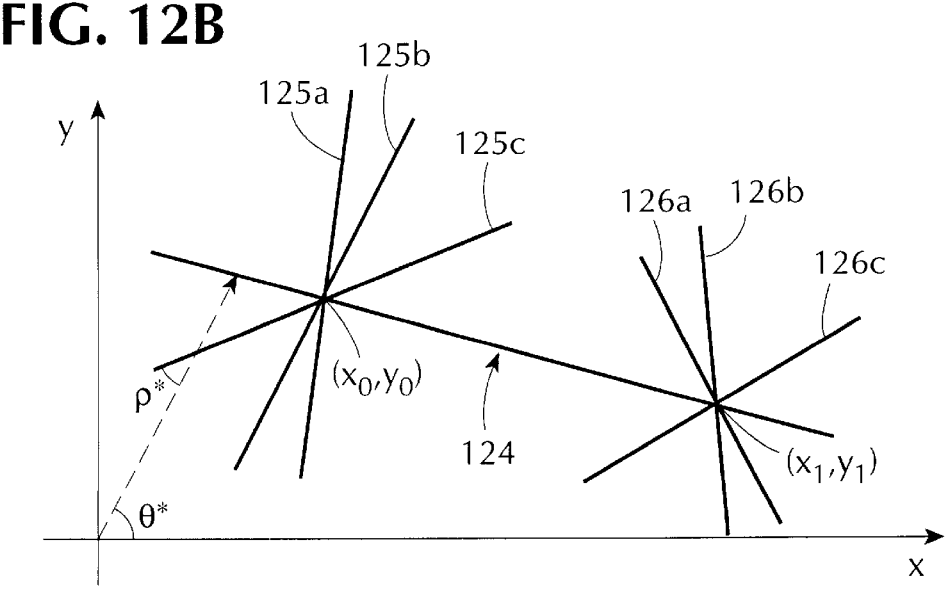

On the other hand, as shown in FIG. 12B, for any two points $(x_0, y_0)$ 128 and $(x_1, y_1)$ 129 there is a straight line 124 passing through both. Accordingly, there exists one pair of parameters ($\rho^*$, $\theta^*$) common to both set $F_{x0,y0}$ and set $F_{x1,y1}$ such that:

$$F_{x0,y0} \cap F_{x1,y1} = \{(\rho^*, \theta^*)\}$$

Subsequently, if many points $(x_1, y_1)$ in a plane form a straight line of parameters ($\rho^*$, $\theta^*$) the parameters shall be a member of all corresponding sets $F_{xi,yi}$. In other words, given a set of points in a plane, the Hough Transformation can be used to detect the existence of a straight line of given parameters by calculating the frequency that the parameters appear in set $F_{xi,yi}$ over all points.

In practice, the line detection algorithm based upon the Hough Transform requires a 2-D accumulator array representing the quantized parameter space ($\rho,\theta$). To detect the lines, the procedure examines every foreground pixel (x, y) in the image, and calculates all quantized values ($\rho,\theta$) in the set $F_{x,y}$. The resulting ($\rho,\theta$) entries in the accumulator array are incremented.

After all pixels have been processed, the accumulator array is searched for high value peaks. These peaks indicate the parameters of the most likely straight lines in the image. The highest peak represents the parameters of the "dominant" straight line in the image.

Figure 13A:
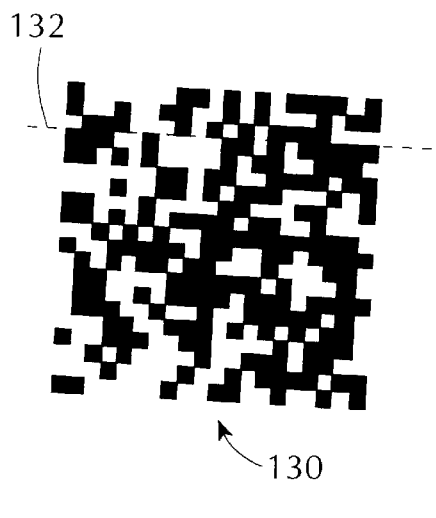
FIGS. 13A and 13B show the alignment of edge pixels in ideal and skewed two-dimensional barcodes of the present invention.
Figure 13B:
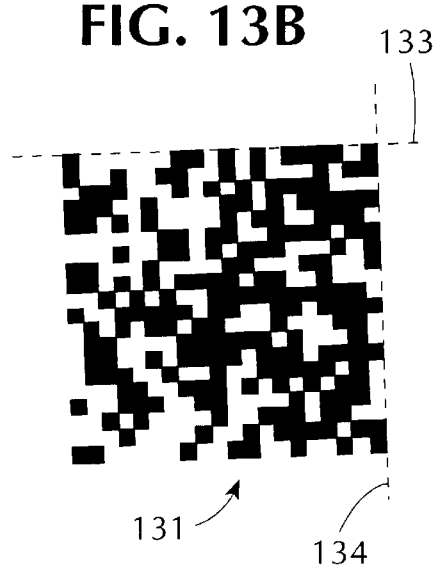

As shown in FIG. 13A, when scanned perfectly, the edge pixels of a PanaMark 130 corresponding to the logical bits in a same row in a PanaMark 130 reside on the same scanline 132. As shown in FIG. 13B, when the PanaMark 131 is skewed, these edge pixels align roughly in the direction of skew, and thus the edge pixels form straight lines, such as parallel scanline 133 and perpendicular scanline 134 with respect to the orientation of PanaMark 131. Thus, the Hough Transform procedure can be used to identify these straight lines, such as scanlines 133 and 134, and subsequently, deduce the skew angle of PanaMark 131.

Figure 14A:
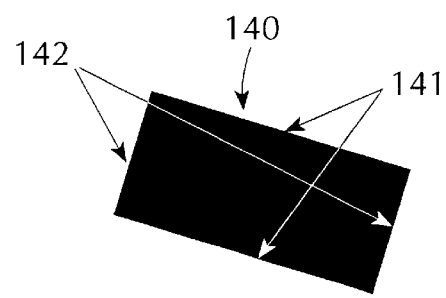
FIGS. 14A and 14B illustrate the four edges of a PanaMark segment and the two masks used to detect the edge pixels in the Hough Transform-based skew detection procedure in accordance with one aspect of the present invention.

The first step of the skew detection procedure based on the Hough Transform is to identify the edge pixels of within a PanaMark. The black and white patterns within a PanaMark have four sides (called "edges" herein). FIG. 14A shows the four edges for a black pattern 140, which are aligned in two orthogonal orientations, i.e., horizontal edges 141 and vertical edges 142. For the purpose of skew estimation, it is sufficient to detect edge pixels in only one orientation, for example, only horizontal edges 141.

Figure 14B:
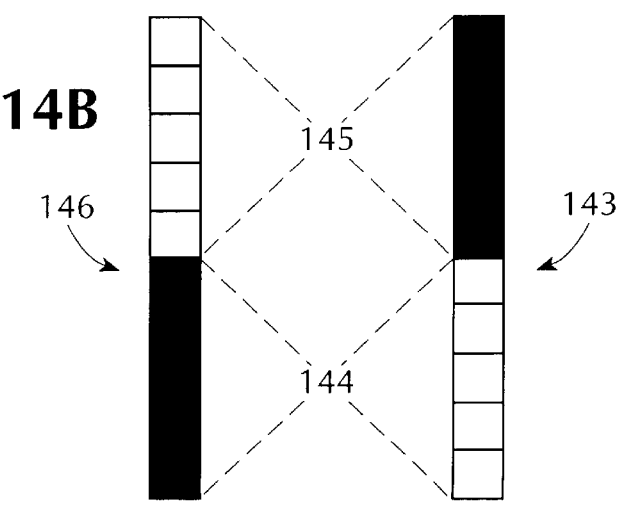

As shown in FIG. 14B, two edge masks 143, 146 are applied to a PanaMark pattern to identify the horizontal edge pixels. Although one edge mask would be adequate to perform skew estimation, in the preferred embodiment disclosed herein two edge masks 143, 146 are used to provide robustness to the identification procedure. Any black pixel locations whose black and white pattern in vertical position matches either of the masks are considered edge pixels. The width of the mask W 145, 146 is preferably set to be one-half of the number of pixels of a PanaMark logical bit in the scanned image.

Figure 15A:
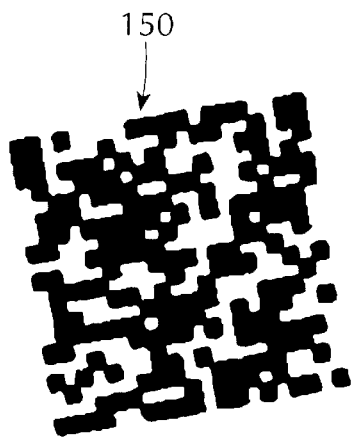
FIG. 15A shows a skewed two-dimensional barcode.
Figure 15B:
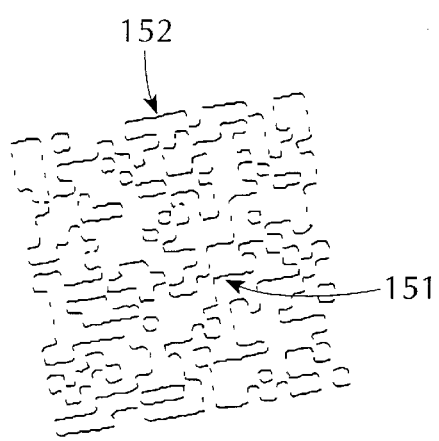
FIG. 15B shows the edges detected within the two-dimensional barcode of FIG. 15A by using the Hough Transform in accordance with the present invention.

FIG. 15A shows a scanned PanaMark 150 with a skew angle of 10° and FIG. 15B shows the horizontal edge pixels 151 detected in PanaMark 150. Once the edge pixels 151 are identified, the Hough Transform procedure is applied to detect the "dominant" straight line in edge image 152. The skew of the PanaMark 150 is then calculated as the skew of the dominant line in edge image 152.

After the skew angle has been estimated, using either of the procedures just described, it may necessary to apply a corrective deskewing step. As with the other steps involved in reading a PanaMark, there are a number of different ways to accomplish this.

As shown in FIG. 16, a "shear rotation" procedure can be used to deskew the PanaMark for relatively small levels of skew. This is a one-dimensional approximation to a true, two-dimensional trigonometric rotation which would be more costly in terms of computing time to compute. Shear rotation works well for the kinds of small skew angles usually expected. If larger values are detected, the more complex and hence more time consuming process described with respect to FIG. 17 must be used. Two separate one-dimensional steps are performed which amount to sliding the appropriate rows and columns of the PanaMark: a horizontal shear followed by a vertical shear.

Figure 16C:
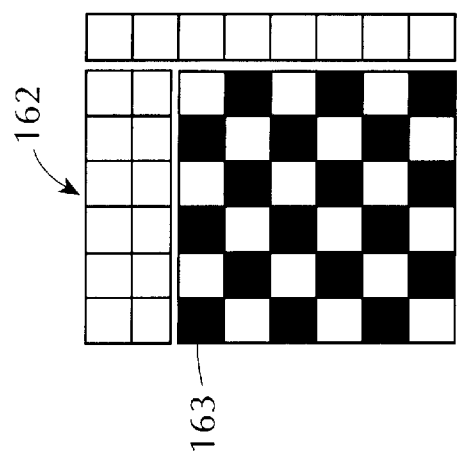
FIG. 16 illustrates the simple deskewing process for the two-dimensional barcode in accordance with of the present invention.
Figure 16B:
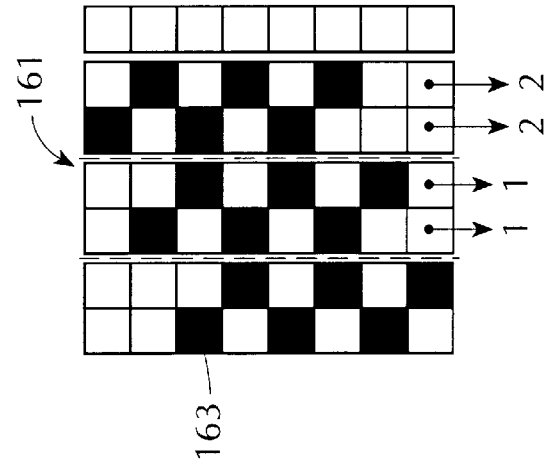
Figure 16A:
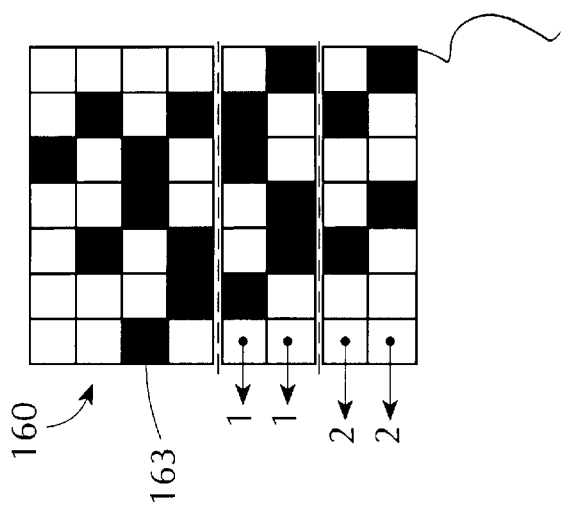

The shear rotation process begins by assuming that the upper-left-most pixel 163 of the PanaMark is correctly placed. Based on the skew estimate determined earlier, a compensating number of pixels to shift each successive row is computed, working down from the top. Likewise, a compensating number of pixels to shift each successive column is computed, again assuming the upper-left-most pixel is correctly placed. The rotation is then performed by shifting first the rows, then the columns, as depicted in FIGS. 16A and 16B. Note that FIGS. 16A and 16B combine the separate steps of calculating the shift with the actual rotation. The first step, as shown in the horizontal shear step, is to calculate working from the top the number of compensating pixels to be shifted for each row of image 160. As indicated to the left of image 160 in FIG. 16A, the top four rows require no shift, the next two rows require a one pixel shift, and the two bottom-most rows require a two pixel shift. The next step, as shown in the vertical shear step, is to calculate working from the left the number of compensating pixels to be shifted for each column of the original image 160. As indicated below image 161 of FIG. 16B, the first two columns require no shift, the next two columns require a one pixel shift, and the final two columns require a two pixel shift. Next, the horizontal shear process is performed on image 160 by shifting the lower four rows of pixels. Finally, the vertical shear process is performed by shifting the right four columns of pixels by the calculated amounts, giving the final result shown in FIG. 16C. The actual PanaMark is only a 6×6 bit array, and the outer white regions shown in PanaMark 162 will be eliminated during the cropping step 75 depicted in FIG. 8 and discussed below.

The example used in FIG. 16 was chosen to illustrate the two shearing operations, but the coarse resolution of the bitmap and the large degree of skew result in a misleading amount of distortion in the output image, which does not occur in practice.

Figure 17:
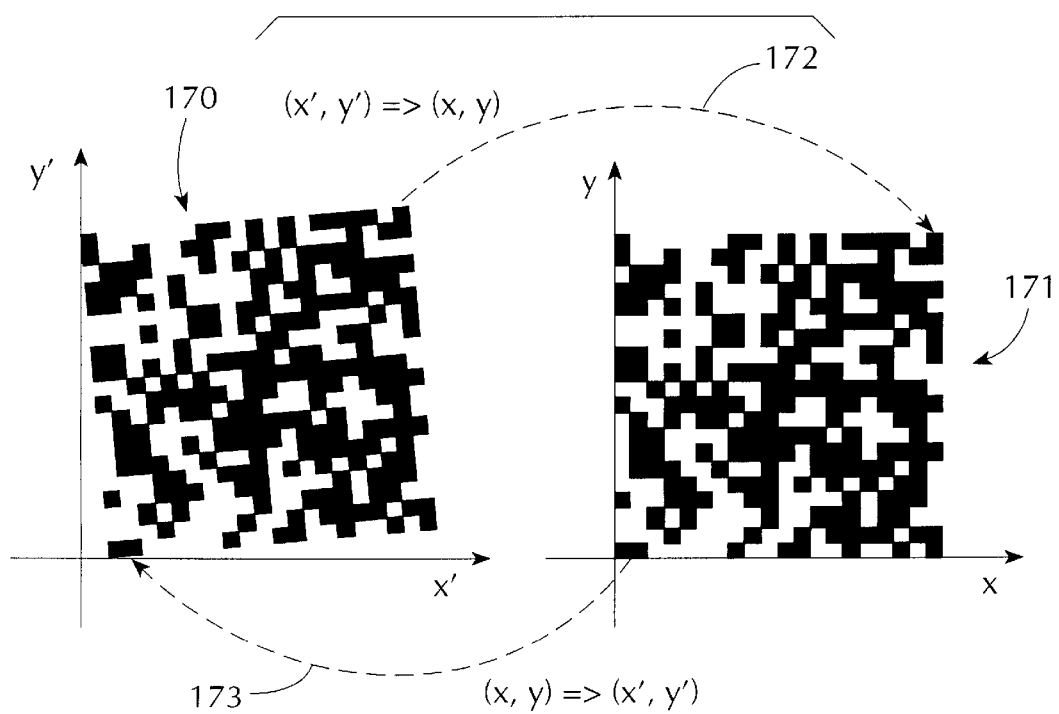
FIG. 17 shows two ways of applying skew correction to the two-dimensional barcode in accordance with the present invention.

As shown in FIG. 17, to implement the trigonometric deskewing step 74 described in FIG. 8, the relationship between a two-dimensional image 171 and its skewed (or rotated) counterpart 170 can be described as an affined transformation of coordinates by the well-known equations:

$$x' = x \cos \theta - y \sin \theta \quad (1)$$

$$y' = x \sin \theta + y \cos \theta \quad (2)$$

where (x, y) and (x', y') are the pixel coordinates in the original image 171 and the skewed image 170, respectively, and θ is the skew angle.

Consequently, once θ is known, the original image 171 can be recovered from its skewed version 170 by the inverse transformation:

$$x = x' \cos \Phi + y' \sin \Phi \quad (3)$$

$$y = -y' \sin \theta + y' \cos \theta \quad (4)$$

A straightforward way of implementing skew correction is to compute the deskewed image 171 coordinate (x, y) for each black pixel (x', y') in the input image 170 using the inverse transformation (equations (3) and (4)), as shown by the dotted line 173 in FIG. 17. Each pixel (x, y) is then set to the be the color of pixel (x',y').

Alternatively, the operation can be done in the opposite way: for every pixel (x, y) in the goal image, its position in the input image (x',y') is computed via equations (1) and (2), as shown by the dotted line 172 of FIG. 17. The pixel color is then copied from the computed location to (x, y).

From the mathematical point of view, the two implementations are equivalent. For digital images, however, they are not identical. Both methods have their shortcomings. Due to numerical round-ups, the first implementation may generate small holes in the deskewed image, while the second implementation may result in misplaced edges. Although each method may provide satisfactory results, the second method is the preferred method.

After the PanaMark has been deskewed, the bounding box calculated with respect to FIG. 9 surrounding the PanaMark may be too "loose", i.e., there are more pixels within the bounding box than is needed to extract the data bits. For example, as shown in FIGS. 16A–16C, if the original bitmap measures 8×7 pixels and the final deskewed bitmap measures 6×6 pixels, two columns and one row of pixels must be discarded. Hence, another set of operations much like the original locate step described with respect to FIG. 9 is performed, with slightly tighter thresholds since it is no longer necessary to worry about chopping off the corners of the PanaMark.

At this point, the scanned PanaMark has been located, deskewed, and tightly cropped. The next step is to read out the data bits, which transforms the PanaMark from the image domain, where each bit is represented as a collection of black or white pixels, to a 20×20 bit array, in the preferred embodiment, of logical values. Note that since the PanaMark symbology is clock-free, there are no predetermined reference patterns to help orient the reading process. However, the logical size of the PanaMark is known in advance, for example, a square measuring 20 bits on each side in the preferred embodiment. Moreover, because the bits in the mark are pseudo-randomized during the encoding process, any particular row or column of pixels will show a higher distribution of black-white and white-black transitions near the edges in the logical rows and columns, and a lower distribution near the centers. This process is fully described in the '280 application. Once the horizontal and vertical center lines have been established by the process described in the '280 application, the bits are read out of the PanaMark by recording the pixel value lying at the intersection of each horizontal and vertical center line (for example, setting each "white" pixel value="0" and each "black" pixel value="1").

Figure 18A:
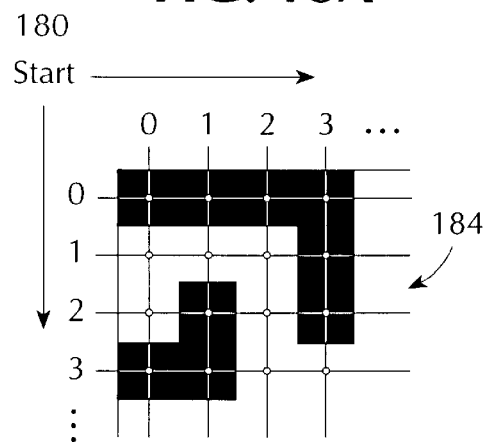
FIGS. 18A–18D illustrate the four alternative directions for reading the data from the two-dimensional barcode in accordance with the present invention.
Figure 18B:
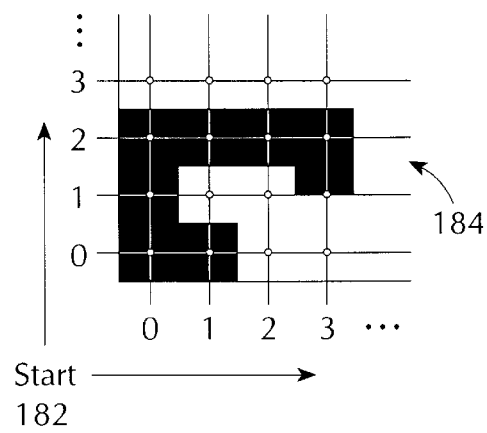
Figure 18C:
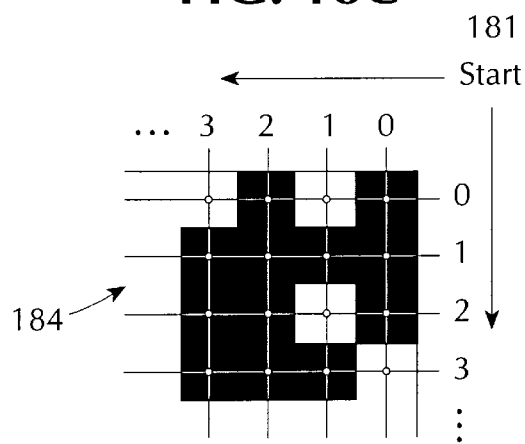
Figure 18D:
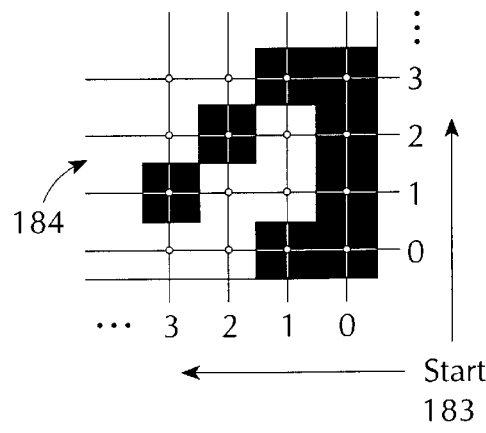

As shown in FIG. 18A, the basic clocking process corresponds to starting the NW (upper-left) corner of PanaMark 184 and reading out the data in a left-to-right, top-to-bottom fashion. As shown in FIGS. 18C–18D, the same paradigm can be applied, though, beginning at any of the other three corners. (SW, NE, SE) as well. In theory, the output from these four alternative clockings should be the same. However, because of scanning variations and round-off errors, the results can in fact be different. However, based on feedback from the ECC step, there is a choice of using the best of the four different readings, made in the four alternative directions described in FIGS. 18A–18D. In other words, if the ECC reports two errors detected during the left-to-right, top-to-bottom clocking, while the other clocking all return 15 errors, then the first set of results should be used and the remainder discarded. This has the effect of reducing the overall error rate with high probability.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A method of decoding randomized information printed on a printed medium in the form of a bitmap of rows and columns of data pixels representing encoded data bits, each of said data pixels being either a first or second color, said printed medium further having other printed information thereon, comprising the steps of:

scanning said printed medium to digitize said bitmap and said other information;

formatting said bitmap and said other information to a pixel based grayscale representation;

setting the threshold intensity level based on said grayscale representation such that pixels above said threshold correspond to said first color and pixels below said threshold correspond to said second color;

determining the row and column boundaries by determining the number of first color pixels in each row and each column of the scanned printed medium, and sequentially comparing the number of first pixels in each row and column, respectively, to a predetermined threshold;

determining the skew angle of said digitized bitmap;

deskewing said digitized bitmap so that said skew angle is reduced to substantially zero;

cropping said digitized bitmap;

reading out binary data from said digitized bitmap in a predetermined pattern to produce a one-dimensional array of digital data;

derandomizing said one-dimensional array of digital data; and error-correcting the derandomized one-dimensional array of digital data to produce a substantially error-free digital representation of the encoded information.

2. A method of decoding randomized information printed on a printed medium in the form of a bitmap of rows and columns of data pixels representing encoded data bits, each of said data pixels being either a first or second color, comprising the steps of:

scanning said printed medium to digitize said bitmap;

formatting said bitmap to a pixel based grayscale representation;

setting the threshold intensity level based on said grayscale representation such that pixels above said threshold correspond to said first color and pixels below said threshold correspond to said second color;

determining the skew angle of said digitized bitmap by either a template matching procedure or a Hough-transform procedure;

deskewing said digitized bitmap so that said skew angle is reduced to substantially zero;

cropping said digitized bitmap;

reading out binary data from said digitized bitmap in a predetermined pattern to produce a one-dimensional array of digital data;

derandomizing said one-dimensional array of digital data; and error-correcting the derandomized one-dimensional array of digital data to produce a substantially error-free digital representation of the encoded information.

3. A method of decoding randomized information printed on a printed medium in the form of a bitmap of rows and columns of data pixels representing encoded data bits, each of said data pixels being either a first or second color, comprising the steps of:

scanning said printed medium to digitize said bitmap;

formatting said bitmap to a pixel based grayscale representation;

setting the threshold intensity level based on said grayscale representation such that pixels above said threshold correspond to said first color and pixels below said threshold correspond to said second color;

determining the skew angle of said digitized bitmap;

deskewing said digitized bitmap so that said skew angle is reduced to substantially zero by either a shear rotation procedure or a trigonometric procedure;

cropping said digitized bitmap;

reading out binary data from said digitized bitmap in a predetermined pattern to produce a one-dimensional array of digital data;

derandomizing said one-dimensional array of digital data; and error-correcting the derandomized one-dimensional array of digital data to produce a substantially error-free digital representation of the encoded information.

4. A method of decoding randomized information printed on a printed medium in the form of a bitmap of rows and columns of data pixels representing encoded data bits, each of said data pixels being either a first or second color, comprising the steps of:

scanning said printed medium to digitize said bitmap;

formatting said bitmap to a pixel based grayscale representation;

setting the threshold intensity level based on said grayscale representation such that pixels above said threshold correspond to said first color and pixels below said threshold correspond to said second color;

determining the skew angle of said digitized bitmap;

deskewing said digitized bitmap so that said skew angle is reduced to substantially zero;

cropping said digitized bitmap;

reading out binary data from said digitized bitmap in a predetermined pattern in each of four alternative directions to produce four alternative one-dimensional arrays of digital data;

derandomizing said four one-dimensional arrays of digital data; and error-correcting said four derandomized one-dimensional arrays of digital data and selecting the one-dimensional array of digital data with the least number of errors for output of the decoded information.

5. A method of decoding randomized information printed on a printed medium in the form of a bitmap of rows and columns of data pixels representing encoded data bits, each of said data pixels being either a first or second color, comprising the steps of:

scanning said printed medium to digitize said bitmap;

formatting said bitmap to a pixel based grayscale representation;

setting the threshold intensity level based on said grayscale representation such that pixels above said threshold correspond to said first color and pixels below said threshold correspond to said second color;

determining the skew angle of said digitized bitmap;

deskewing said digitized bitmap so that said skew angle is reduced to substantially zero;

cropping said digitized bitmap;

reading out binary data from said digitized bitmap in a predetermined pattern to produce a one-dimensional array of digital data; and derandomizing and error-correcting said a one-dimensional array of digital data by alternative designated keys until the errors determined fall below a predetermined level.

6. The method as in claim 1, 3, 4 or 5, wherein said skew angle determining step uses either a template matching procedure or a Hough-transform procedure.

7. The method as in claims 1, 2, 4 or 5, wherein said deskewing step uses either a shear rotation procedure or a trigonometric procedure.

8. The method as in claims 1, 2 or 3, wherein said reading step reads said binary data in each of four alternative directions creating four alternative one-dimensional arrays of digital data, and said error correcting step selects the one-dimensional array of digital data with the least number of errors for output.

9. The method as in claims 1, 2 or 3, wherein said derandomizing step repeatedly derandomizes said one-dimensional array of digital data by alternative designated keys until the errors detected by said error correcting step fall below a preset threshold.

10. The method as in claims 1, 2, 3, 4 or 5, wherein said reading step comprises the steps of:

determining the number of horizontal and vertical edges in each respective row and column of said bitmap;

determining the row center lines from the local minima in the horizontal edge counts;

determining the column center lines from the local minima in the vertical edge counts; and reading out binary data located at the intersection of each row center line and column center line in a predetermined pattern to produce a one-dimensional digital representation of said digitized bitmap.

* * * * *